United States Patent
Wu (10) Patent No.: US 6,968,370 B2
(45) Date of Patent: Nov. 22, 2005

(54) METHOD OF TRANSFERRING RESOURCES BETWEEN DIFFERENT OPERATION SYSTEMS

(76) Inventor: Tuan-Hui Wu, 6F, No. 113-1, ChungYi Street, Taipei (TW)

( * ) Notice: Subject to any disclaimer, the term of this patent is extended or adjusted under 35 U.S.C. 154(b) by 776 days.

(21) Appl. No.: 09/815,833

(22) Filed: Mar. 24, 2001

(65) Prior Publication Data

US 2002/0133574 A1 Sep. 19, 2002

(30) Foreign Application Priority Data

Jan. 17, 2001 (TW) .................................. 90101070 A (51) Int. Cl.⁷ .......................................... G06F 15/177
(52) U.S. Cl. .................................. 709/220; 709/222
(58) Field of Search ................................ 709/220–222; 719/319; 707/1, 10, 204, 205; 717/147; 345/700, 733, 735, 736, 2.1, 2.2, 961

(56) References Cited

U.S. PATENT DOCUMENTS

| | | | | |
|---|---|---|---|---|
| 5,367,698 A | * | 11/1994 | Webber et al. | 709/203 |
| 5,673,403 A | * | 9/1997 | Brown et al. | 715/744 |
| 5,715,458 A | * | 2/1998 | Holder et al. | 719/319 |
| 5,831,609 A | * | 11/1998 | London et al. | 715/746 |
| 5,832,274 A | * | 11/1998 | Cutler et al. | 717/171 |
| 6,049,822 A | * | 4/2000 | Mittal | 709/217 |
| 6,110,229 A | * | 8/2000 | Yamaguchi | 717/178 |
| 6,161,176 A | * | 12/2000 | Hunter et al. | 713/1 |
| 6,182,212 B1 | * | 1/2001 | Atkins et al. | 713/1 |
| 6,202,206 B1 | * | 3/2001 | Dean et al. | 717/177 |
| 6,370,646 B1 | * | 4/2002 | Goodman et al. | 713/100 |
| 6,594,689 B1 | * | 7/2003 | Nowatzki et al. | 709/208 |
| 6,654,785 B1 | * | 11/2003 | Craig | 709/203 |
| 2002/0059565 A1 | * | 5/2002 | Reyna et al. | 717/146 |
| 2002/0124245 A1 | * | 9/2002 | Maddux et al. | 717/176 |
| 2003/0191799 A1 | * | 10/2003 | Araujo et al. | 709/203 |

OTHER PUBLICATIONS

Ying Zhang, Samba Server Step–by–Step Guide, Mar. 15, 1999.*

* cited by examiner

Primary Examiner—Jeffrey Gaffin
Assistant Examiner—David Martinez (57) ABSTRACT

A method for transferring resources between a first group of computers executing a first operating system and a second group of computers executing a second operating system is provided. Each group of computers has at least one file server executing its respective operating system such as a WINDOWS SERVER (including NT, 2000, XP, and all descended server OS) operating systems or a LINUX operating system. The resources of a first file server in the first group including multiple configurations, files and directories are first transferred to a second file server in the second group. A human-computer interface control program running on the file server in the second group is then provided for administrating the transferred resources on the file server. The human-computer interface control program executed in the second operating system on the second file server has a user interface identical to the resource administration program executed in the first operating system to ensure the integrity of the configurations, files and directories transferred to the second file server of the second group.

6 Claims, 14 Drawing Sheets

METHOD OF TRANSFERRING RESOURCES BETWEEN DIFFERENT OPERATION SYSTEMS

FIELD OF THE INVENTION

This invention provides a method to transfer resources between different operating systems. The invention is specialized in transferring resources between Windows NT operating system and Linux operating system.

BACKGROUND OF THE INVENTION

These days, many corporations already use MICROSOFT WINDOWS NT (or 2000, XP) operating system as the environment of their computer file servers. However, as more and more supportive features are available to the LINUX operating system, and the software development cost in LINUX operating system is significantly lower than those in MICROSOFT WINDOWS, some corporations started to consider switching to the LINUX operating system.

In fact, many corporations already switch to the LINUX operating system. However, the two operating systems are not compatible with each other in many ways and they have different approaches and configuration files in managing their resources. As a result, the computers running in the MICROSOFT WINDOWS operating system can not access the resources running in the LINUX operating system and vice versa. The new problem that these corporations face is how to transfer the resources from the old system to the new one successfully and effectively.

SUMMARY OF THE INVENTION

The primary object of the invention is to provide a method for transferring resources between a first group of computers executing a first operating system and a second group of computers executing a second operating system. Each group of computers has at least one file server executing its respective operating system such as a WINDOWS SERVER (including NT, 2000, XP, and all descended server OS) operating systems or a LINUX operating system.

According to the invention, the resources of a first file server in the first group including multiple configurations, files and directories are first transferred to a second file server in the second group. A human-computer interface control program running on the second file server in the second group is then provided for administrating the transferred resources on the second file server. The human-computer interface control program executed in the second operating system on the second file server has a user interface identical to the resource administration program executed in the first operating system to ensure the integrity of the configurations, files and directories transferred to the second file server of the second group.

In addition to files and directories, the invention also provides methods for transferring user and group information of the first file server to the second file server. After copying user and group configurations from the first file server to the second file server, commands, instructions and file sharing software in the second operating system can be used to add user and group configurations to appropriate configuration files in the second file server.

Similarly, E-mail users and accounts can also be transferred to the second file server by first copying the associated files, resources and configurations from the first file server to the second file server and then running e-mail administrating software in the second file server. Furthermore, information related to hypertext transfer protocol (HTTP), server, file transfer protocol (FTP) server and other file or web servers can also be transferred.

The following embodiment and the attaching drawings provide detailed explanation to help people understand the objectives, characteristics and benefits of the invention.

BRIEF DESCRIPTION OF THE DRAWINGS

The related drawings in connection with the detailed description of this invention, which is to be made later, are described briefly as follows, in which.

DETAILED DESCRIPTION OF THE INVENTION

Figure 1:
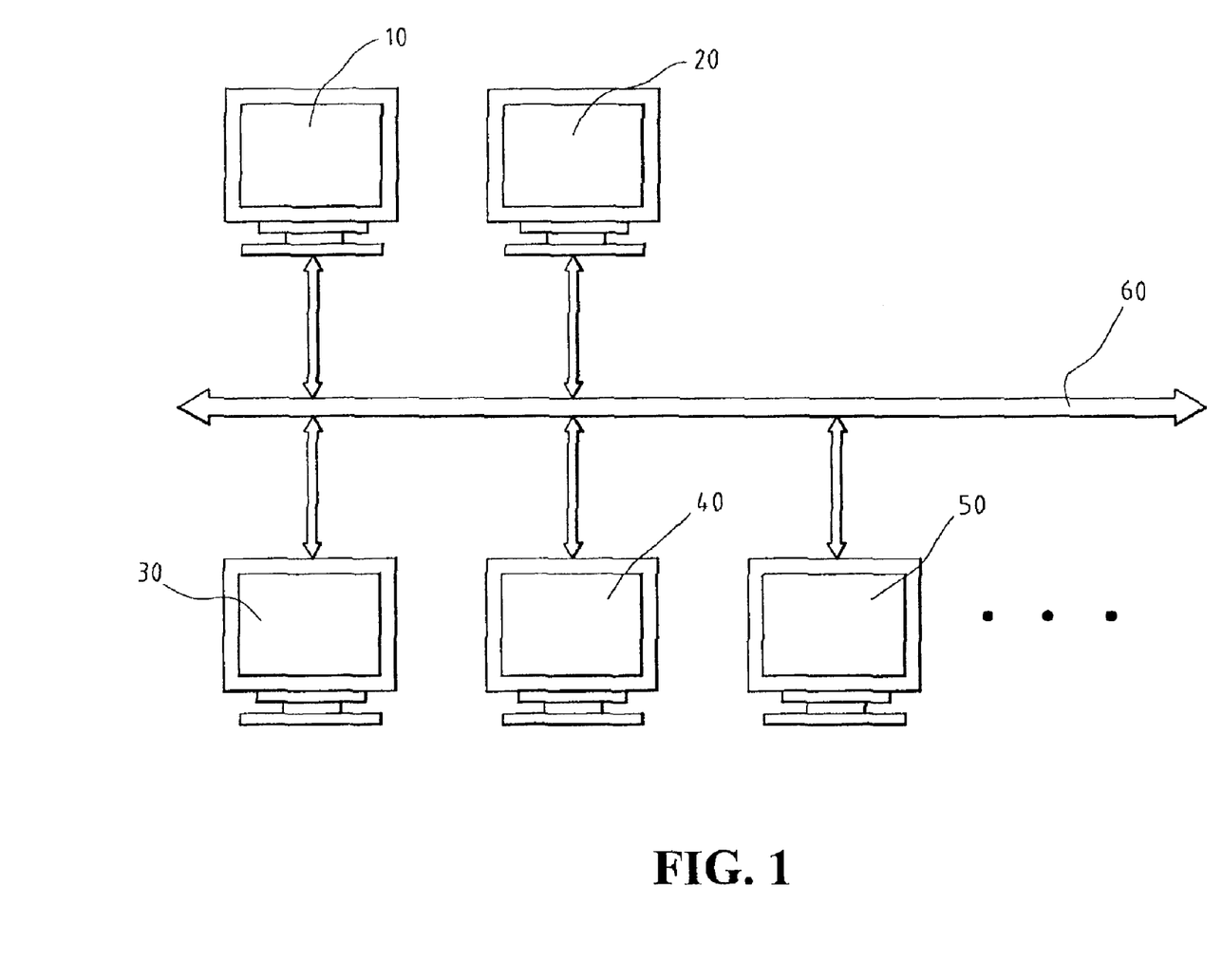
FIG. 1 shows a computer network environment where the method of this invention is used.

FIG. 1 shows a computer network environment in which the method of this invention is used. In FIG. 1, a Local Area Network 60 links the first file server 10 executing MICROSOFT WINDOWS SERVER (including NT, 2000, XP, and all descended server OS) operating system, the second file server 20 executing LINUX operating system and several user end (client) computers 30, 40, etc. executing MICROSOFT WINDOWS operating system. The user end computers 30, 40 could execute MICROSOFT WINDOWS operating system such as MICROSOFT WINDOWS 98 operating system, MICROSOFT WINDOWS MILLENNIUM Edition Windows operating system, or MICROSOFT WINDOWS operating system NT WORKSTATION version (or XP, 2000, and other descended OS). Under a network environment based on MICROSOFT WINDOWS operating system, user end computers 30, 40 could share the resources, such as files and directories, with the first file server 10 via Local Area Network 60.

However, if the user end computer 30 is switched from MICROSOFT WINDOWS operating system to LINUX operating system, or in another case, a new LINUX based user end computer 50 is added to Local Area Network 60, either user end computer 30 or user end computer 50 could not share resources with the first file server 10 in these two cases.

The above problem would be solved if the second file server 20 could apply the method of this invention and transfer the shared resources from the first file server 10 to the second file server 20. So, in the two cases mentioned above, user end computer 30 and user end computer 50 could share the transferred resources with the second file server 20 via Local Area Network 60.

Figure 2:
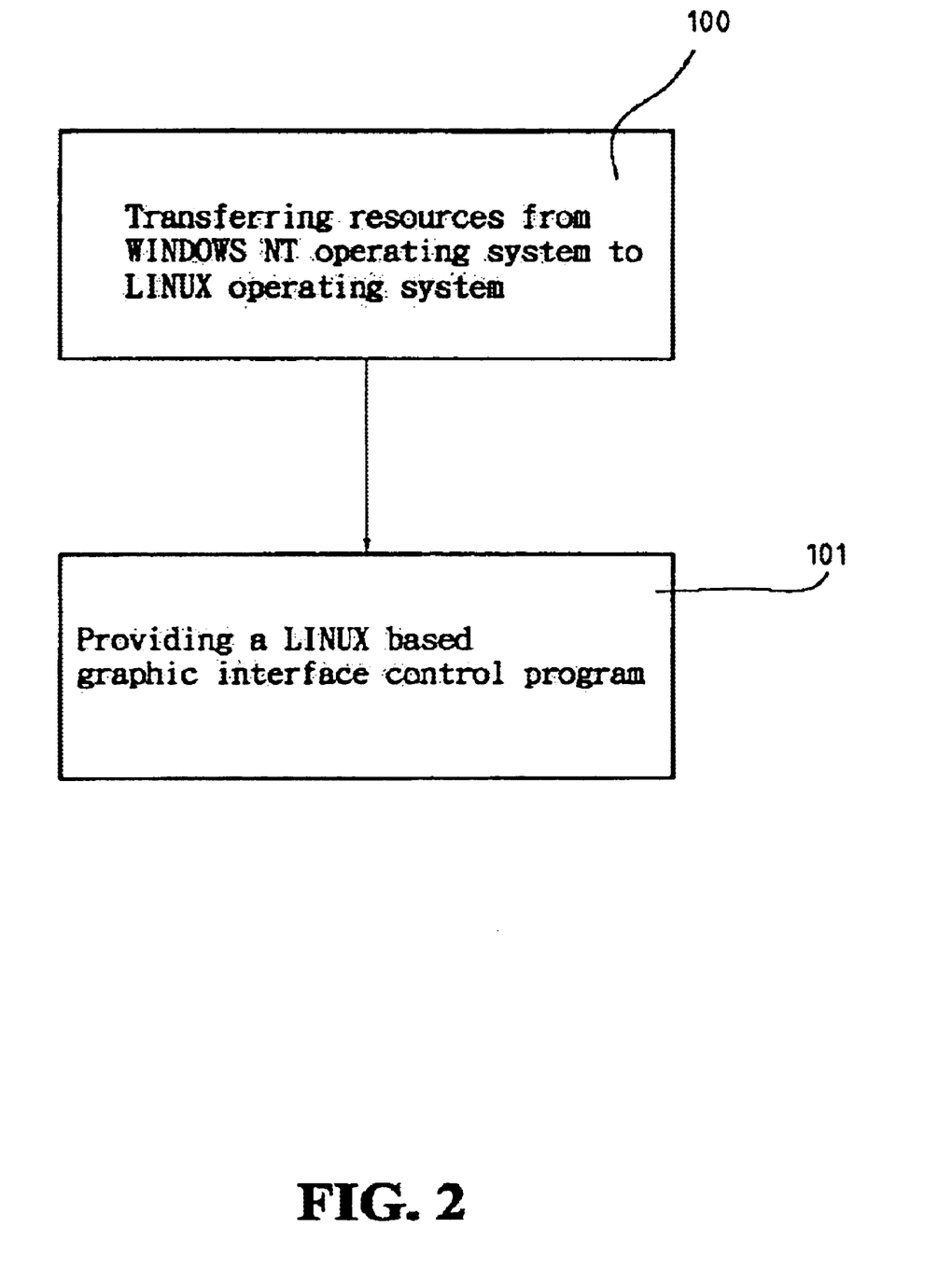
FIG. 2 shows the flow chart of the invention.

FIG. 2 shows the flow chart of the invention. In step 100, the configurations, files and directories in the first file server 10 executing WINDOWS SERVER (including NT, 2000, XP, and all descended server OS) operating system are transferred to the second file server 20 executing LINUX operating system. Examples of the configurations, files and directories in the first file server 10 are MICROSOFT WINDOWS SERVER (including NT, 2000, XP, and all descended server OS) operating system shared files, shared directories, users, groups (groups), all information related to e-mail server software, all information related to web server software, and all information related to FTP server software, etc.

In step 101, the invention provides a LINUX based human-computer interface control program, which has the same user interface as that in the WINDOWS NT operating system, on the second file server 20 to ensure the integrity of the configurations, files, and directories transferred in step 100. The major reason that the invention provides the above interface control program is to ensure that administrators who are familiar with WINDOWS SERVER (including NT, 2000, XP, and all descended server OS) operating system on the first file server 10 could easily use the same WINDOWS NT based human-computer interface to administrate the resources on the second file server 20.

The following article will explain in detail the actual steps to transfer WINDOWS NT operating system configurations, files and directories from the first file server 10 to the second file server 20.

First, let us explain the actual steps to transfer all information related to file server software from the first file server 10 to the second file server 20. The first file server 10 executes "rmtshare.exe" instruction to get all shared directories under WINDOWS SERVER (including NT, 2000, XP, and all descended server OS) operating system. Examples of the shared directories are:

| Share name | Resource | Remark |
| --- | --- | --- |
| NETLOGON | C:\WINNT\System32\Rep1\Import | |
| ADMIN$ | C:\WINT | |
| I386 | C:\I386 | |

Then, execute the instruction of the shared directory name parameter in every shared directory and get the user authority configurations of the shared directories. The following example shows a possible outcome after executing "rmtsha-re.exe C:\I386" instruction to get the "C:\I386" user authority configurations:

| Share name | \\lspntserver\i386 | | |
| --- | --- | --- | --- |
| Path: | C:\I386 | | |
| REMARK | | | |
| LSPDOMAIN | \adam: | FULL | CONTROL |
| | \EVERYONE: | READ | |

Then, execute a file sharing software such as SAMBA software in the second file server 20 and write user authority configurations to the associated configuration file "smb.conf" in SAMBA software. At last, create a default directory on the second file server 20, for example default directory "/lsproot", and then copy the shared directories and files under those shared directories on the first file server 10 to that default directory. For instance, copy the shared directories and files under those shared directories in the above example to "/lsproot" default directories. Thus, the second file server 20 will have exactly the same shared directories, the files under those shared directories and user authority as in the first file server 10. This example explains how user end computer 50 could share transferred resources such as "/lsproot/I386" with the second file server 20 via Local Area Network 60.

Second, let us explain the actual steps to transfer all information related to users and groups in the first file server 10 to the second file server 20. The following example shows a possible user configurations after executing a user administrating command "userstat.exe" in the first file server 10 and getting all users:

| \LSPNTSERVER user account |
| --- |
| adam  Administrator  Guest |
| Tony  IUSER-LSPNTSERVER |

Similar method can be used to retrieve passwords Windows Server. By executing the command "dump.exe>smbpasswd". Then copy this smbpasswd to Linux server, and configure Linux pam module to use smbpasswd as password file.

Then, execute "useradd" instruction in the second file server 20 to add the users to the LINUX operating system. For example, execute "useradd" instruction and add user "adam" in the above user configurations to the LINUX operating system. At the same time, execute "showgrps.exe" instruction in the first file server 10 and get all groups. The following example shows a possible group configuration:

| *Account Operators  *Administrators  *guests |
| --- |
| *Engineers |

Then, execute the instruction of the group name parameter in every group and get the user authority configurations of the groups. For example, execute "showgrps.exe Engineers" instruction and get the users in the "Engineers" groups. The following example shows a possible user configuration of the "Engineers" groups:

| Alias | Engineer | |
|-------|----------|------|
| Members | | |
| adam | emma | test |

Then, write the user configurations of the groups to the files "/etc/group" of the Linux operating system on the second file server 20. "/etc/group" is designed to store group data. For example, write the user configurations in "Engineers" group to "/etc/group" files.

Third, let us explain the actual steps to transfer all information related to e-mail severs in the first file server 10 to the second file server 20. We will repeat the technique above to transfer the user configurations in the first file server 10 to the second file server 20. Then, get the user e-mail account configurations in the first file server 10. For example, get user e-mail account "adam@x.com.tw". Then, execute a LINUX based e-mail management software in the second file server 20. For example, execute the instructions In LINUX's "sendmail" e-mail software to add new e-mail account and thus, add the entire user e-mail account configuration in the first file server 10 to the second file server 20. For example, execute sendmail e-mail software and add user e-mail account "adam@x.com.tw" to the second file server 20.

Fourth, let us explain the actual steps to transfer all information related to web server software in the first file server 10 to the second file server 20. We will get all virtual directory configurations and their corresponding actual directory configurations of WINDOWS NT operating system in the first file server 10. The following example shows a possible virtual directories after executing CSCRIPT of WINDOWS NT operating system to access ADSI objects:
root
IISSAMPLES
IISADMIN
ebusiness
ecredit The first three virtual directories in the above virtual directory example are reserved for IIS (Internet Information Service) software. The later two are virtual directories created by administrators of the first file server 10. Then, we will get individual information of every virtual directory in the first file server 10. For example, the individual information of ebusiness is:
Path: c:\www\ebusiness
Default file: index.htm
browsable: False
Read: True
Write: True From the individual information of virtual directory "ebusiness" in the above example, we could know information such as the corresponding actual directory is "c:\www\ebusiness" and the default file of virtual directory "ebusiness" is "index.htm" file. Then, execute a LINUX based hypertext transfer protocol (HTTP) web server software, such as "Apache" software, in the second file server 20 and write the above virtual directory configurations and their corresponding actual directory configurations to the associated configuration files "http.conf" and "access.conf" of the "apache" software respectively. Then, set a default directory, for example "/lsproot/wwwroot", in the second file server 20. In this case, virtual directory ebusiness will be written into "http.conf" file as "/lsproot/wwwroot/ebusiness", and virtual directory ecredit will be written into "http.conf" file as "/lsproot/wwwroot/ecredit". At last, copy the actual directories and the files under those actual directories in the first file server 10 to the default directory. For example, copy the actual directories and the files under those actual directories of "c:\www\ebusiness" in the first file server 10 to the default directory "/lsproot/wwwroot" in, the second file server 20. Now, "c:\www\ebusiness" is mapped to "/lsproot/wwwroot/ebusiness".

Fifth, let us explain the actual steps to transfer all information related to FTP (File Transfer Protocol) server software in the first file server 10 to the second file server 20. Since IIS controls web server software and FTP server software in MICROSOFT WINDOWS SERVER (including NT, 2000, XP, and all descended server OS) operating system, we could reuse the above techniques to get the virtual directory configurations and their corresponding actual directory configurations of FTP server software used in the first file server 10. Then, execute a LINUX based FTP software, such as "wuftp", "proftp", or "vsftp" software, in the second file server 20 and write the virtual directory configurations and their corresponding actual directory configurations to "/etc/ftpaccess" directory and "/etc/ftphost" directory of the LINUX operating system respectively. Then, set a default directory, for example "/lsproot/ftproot", in the second file server 20 and copy the actual directories and the files under those actual directories in the first file server 10 to the default directory.

Figure 3A:
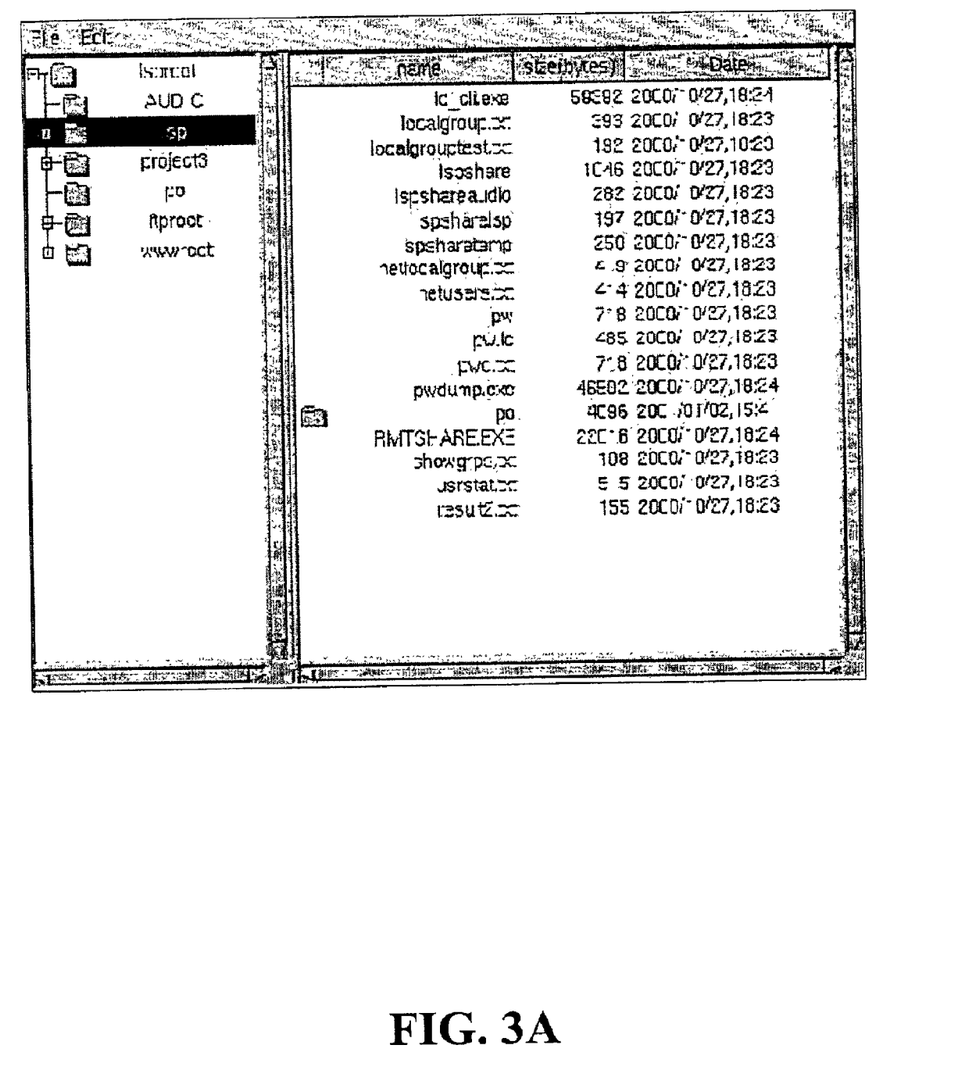
FIG. 3A is a screen snapshot showing that the second file server is executing the first program.
Figure 3B:
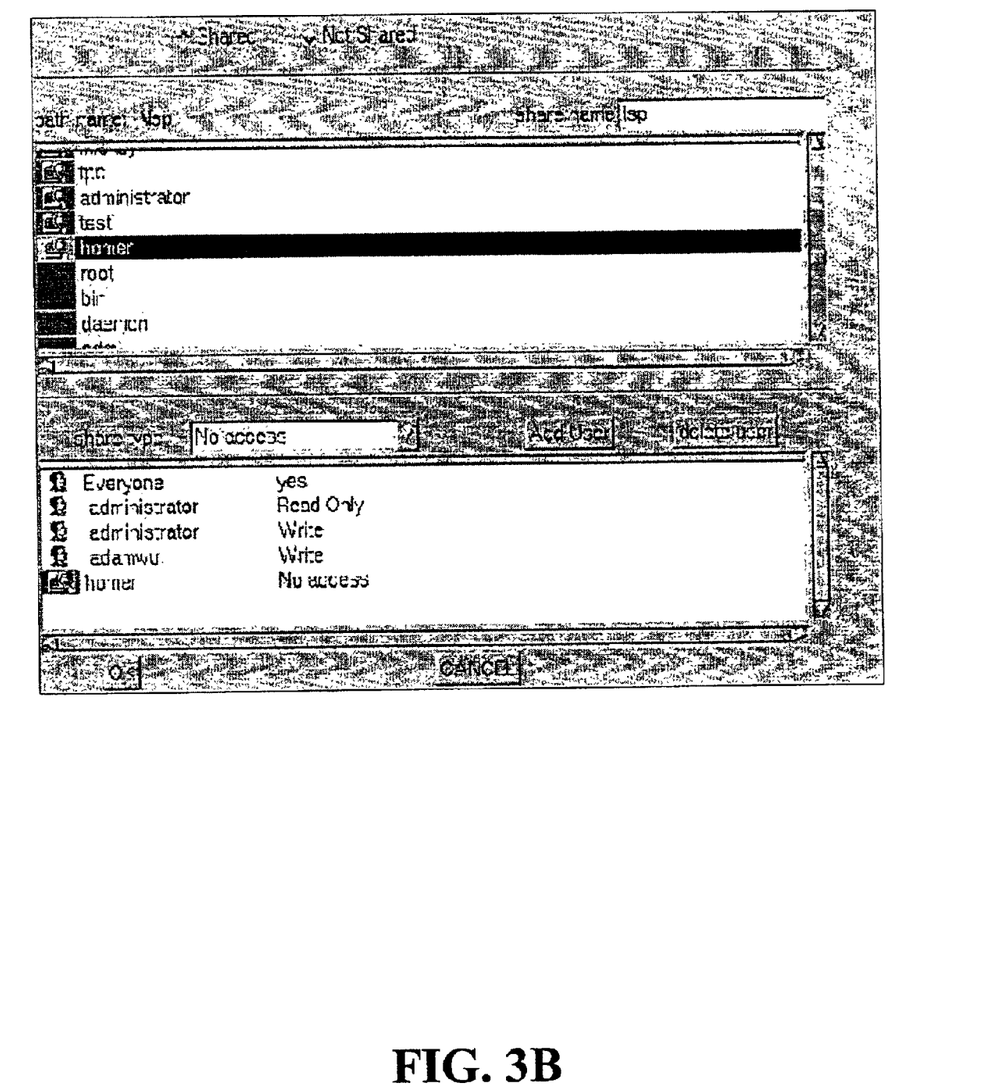
FIG. 3B shows an example to give authority instruction in setting a user account "adamwu"

Based on the method of this invention, the graphic interface control program in steps 101 has a first program. The first program has a human-machine interface with the same interface as in WINDOWS NT operating system to give instructions to directories and files. The second file server 20 can execute the first program and give instructions to directories and files transferred to the second file server 20 in step (100). FIG. 3A is a screen snapshot showing that the second file server 20 is executing the first program; and the administrator of the second file server 20 is giving instruction to the "/lsproot/lsp" directory. FIG. 3B shows an example to give authority instruction in setting a user account "adamwu".

Figure 4A:
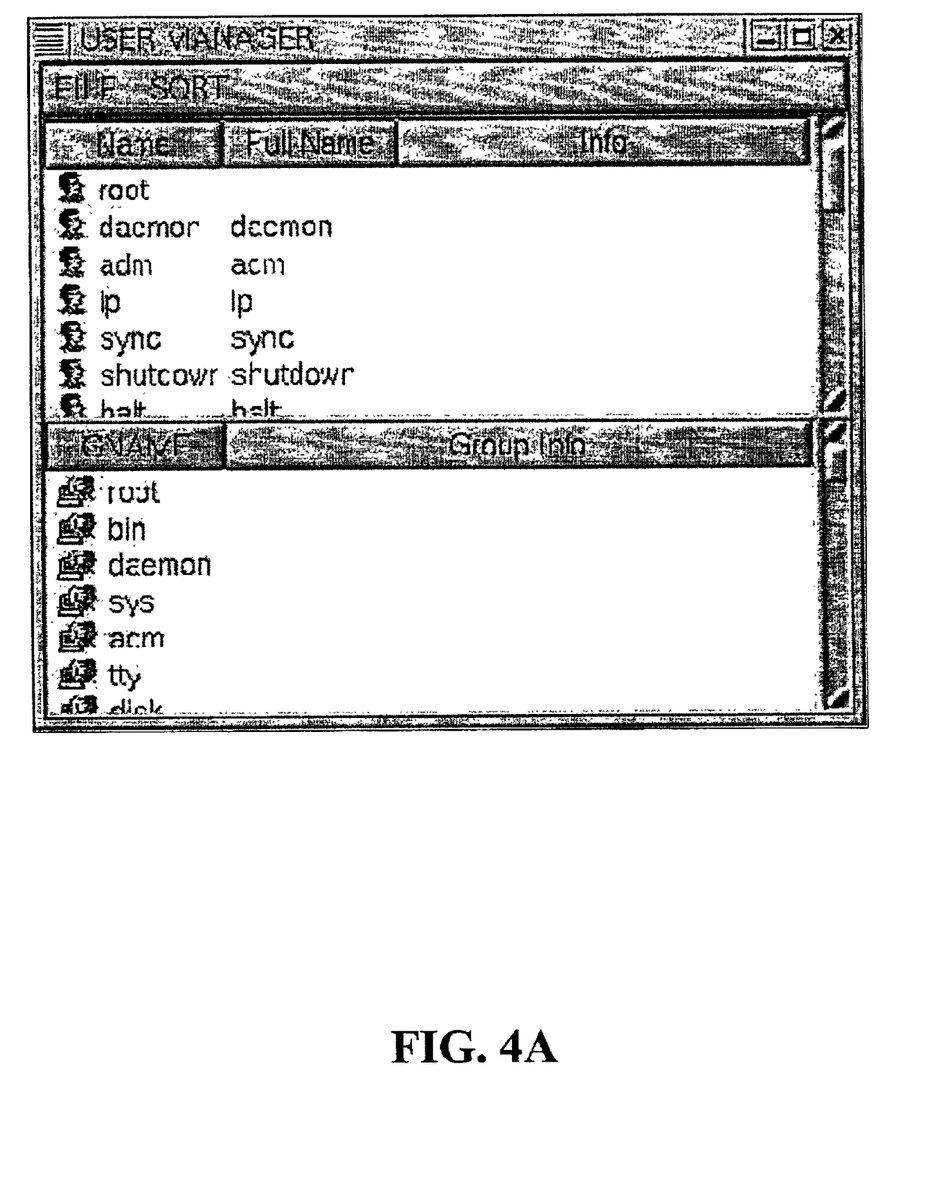
FIG. 4A is a screen snapshot showing that the second file server is executing the second program to administrate users.
Figure 4B:
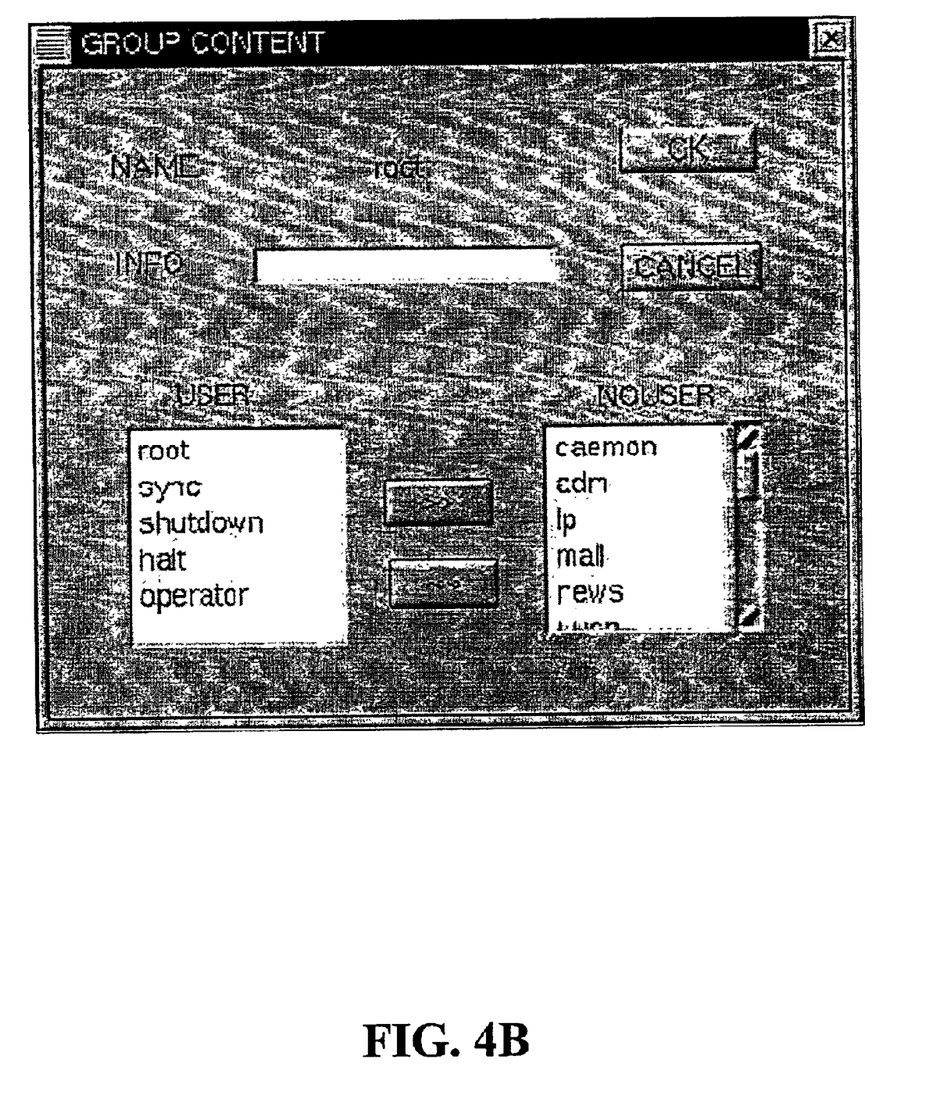
FIG. 4B is a screen snapshot showing that the second file server is executing the second program to administrate groups.

Based on the method of this invention, the graphic interface control program in steps 101 has a second program. The second program has a human-machine interface with the same interface as in WINDOWS NT operating system to give instructions to users and groups. The second file server 20 can execute the second program and give instructions to users and groups transferred to the second file server 20 in step (A). FIG. 4A is a screen snapshot showing that the second file server 20 is executing the second program to administrate users. FIG. 4B is a screen snapshot showing that the second file server 20 is executing the second program to administrate groups.

Figure 5A:
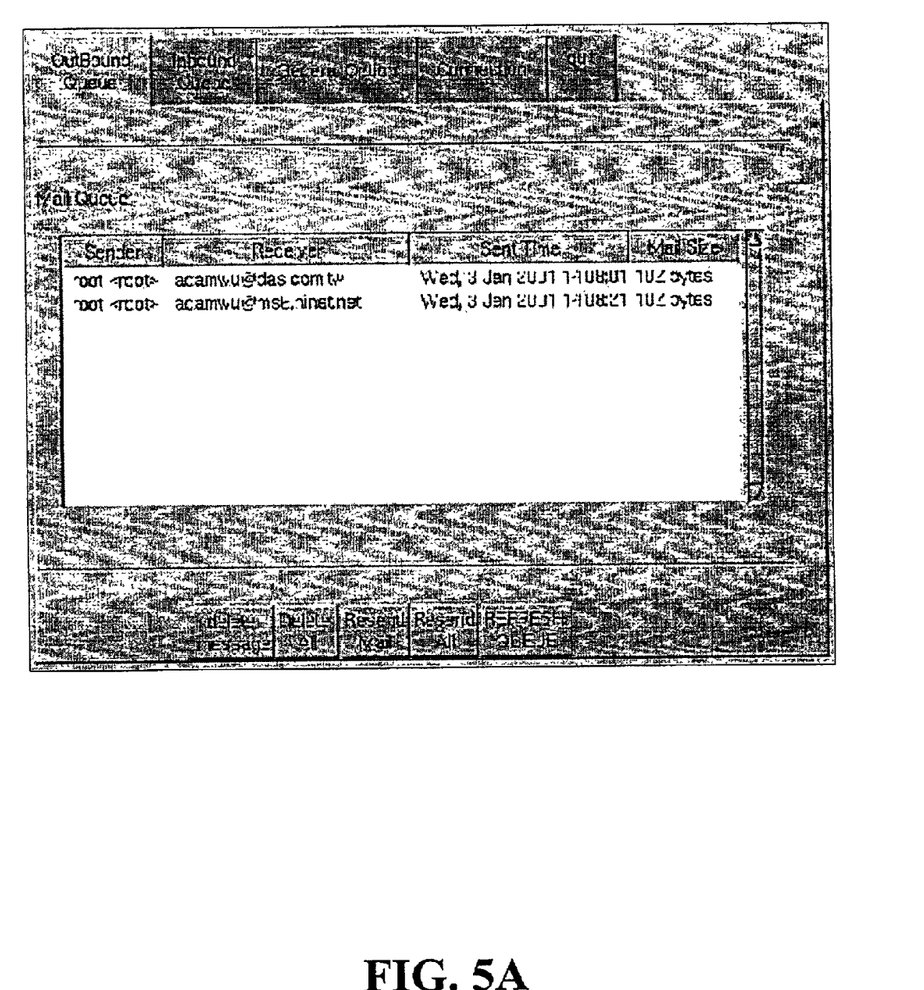
FIG. 5A is a screen snapshot showing that the second file server is executing the third program and how sendmail software administrates e-mails.
Figure 5B:
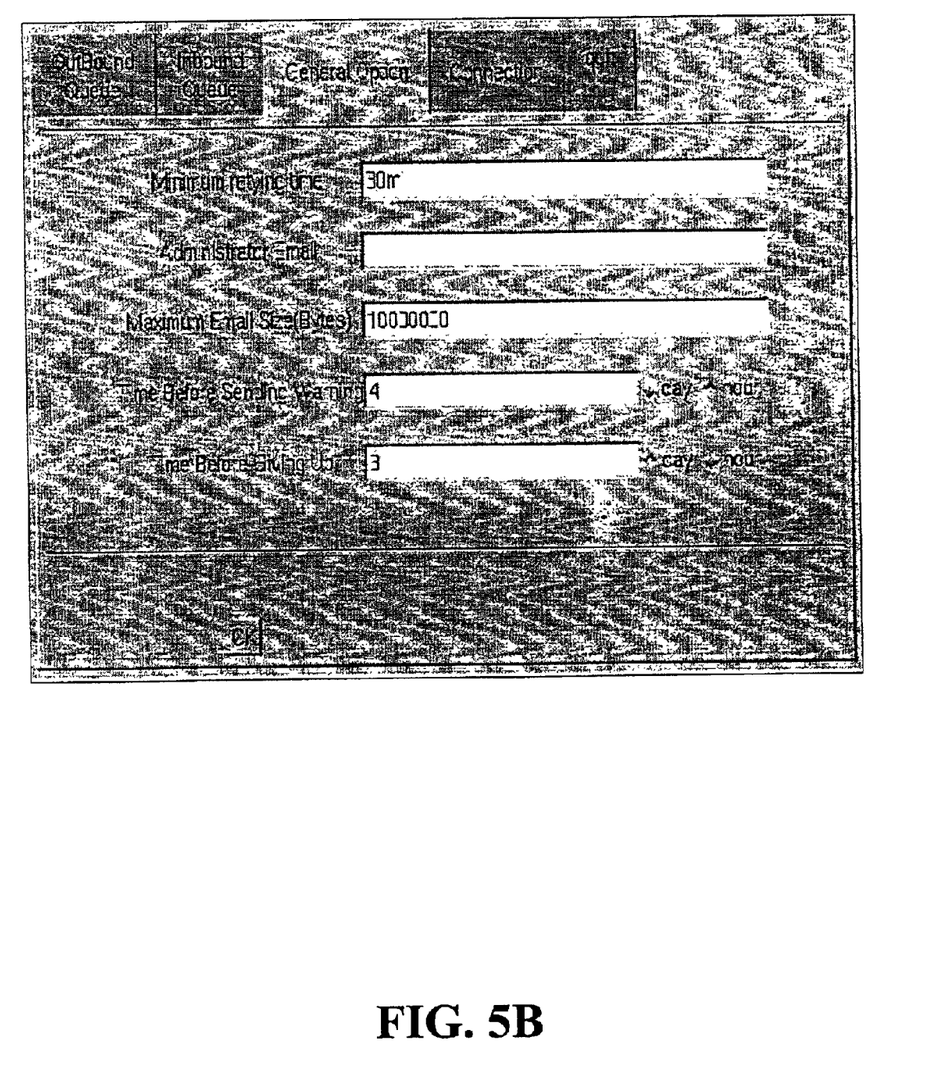
FIG. 5B is a screen snapshot showing that the third program sets parameters in sendmail software.

Based on the method of this invention, the graphic interface control program in steps 101 has a third program. The third program has a human-machine interface with the same interface as in WINDOWS NT operating system to give instructions to users and groups. The second file server 20 can execute the third program and give instructions to e-mails administrated by a LINUX based sendmail software. FIG. 5A is a screen snapshot showing that the second file server 20 is executing the third program and how sendmail software administrates e-mails. In FIG. 5A, the third program gives instructions to delete the e-mails of "adamwu@das.com.tw". FIG. 5B is a screen snapshot showing that the third program sets parameters in sendmail software.

Figure 6A:
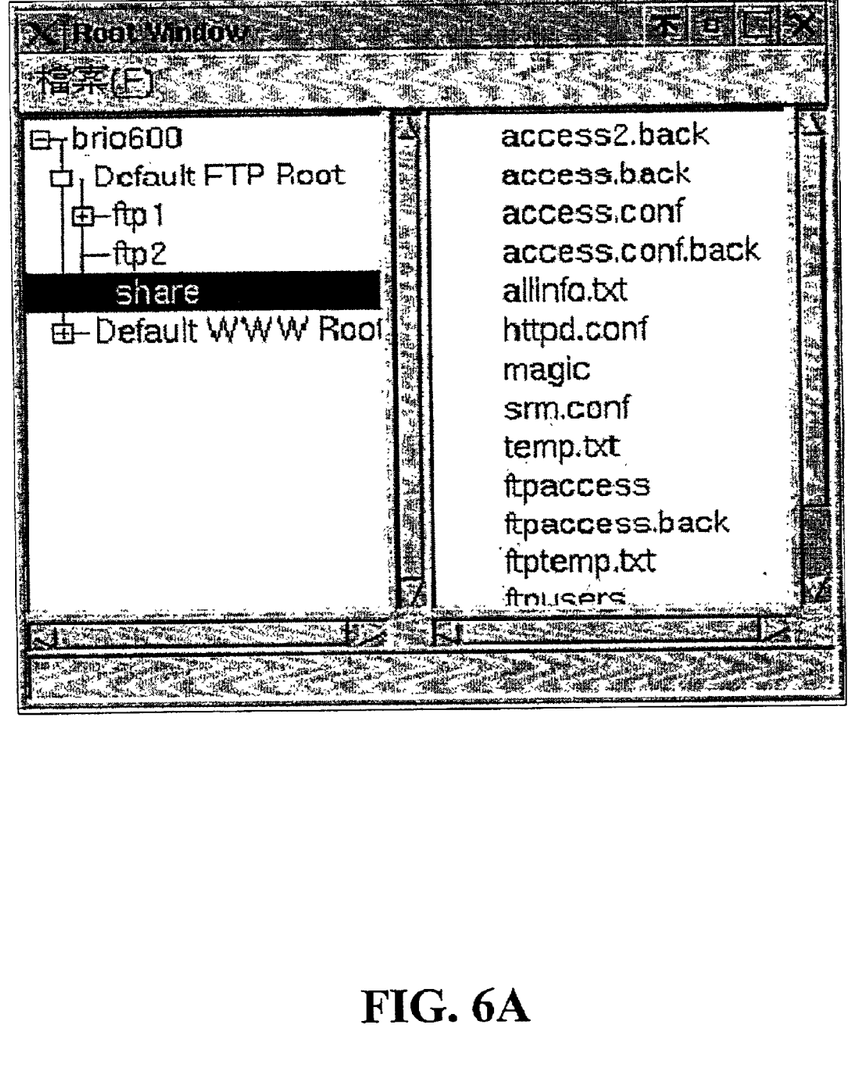
FIG. 6A is a screen snapshot showing that the second file server is executing the forth program and displays the virtual directories needed in executing FTP server software (such as "wuftp", "proftp", and "vsftp" software) in the second file server.
Figure 6B:
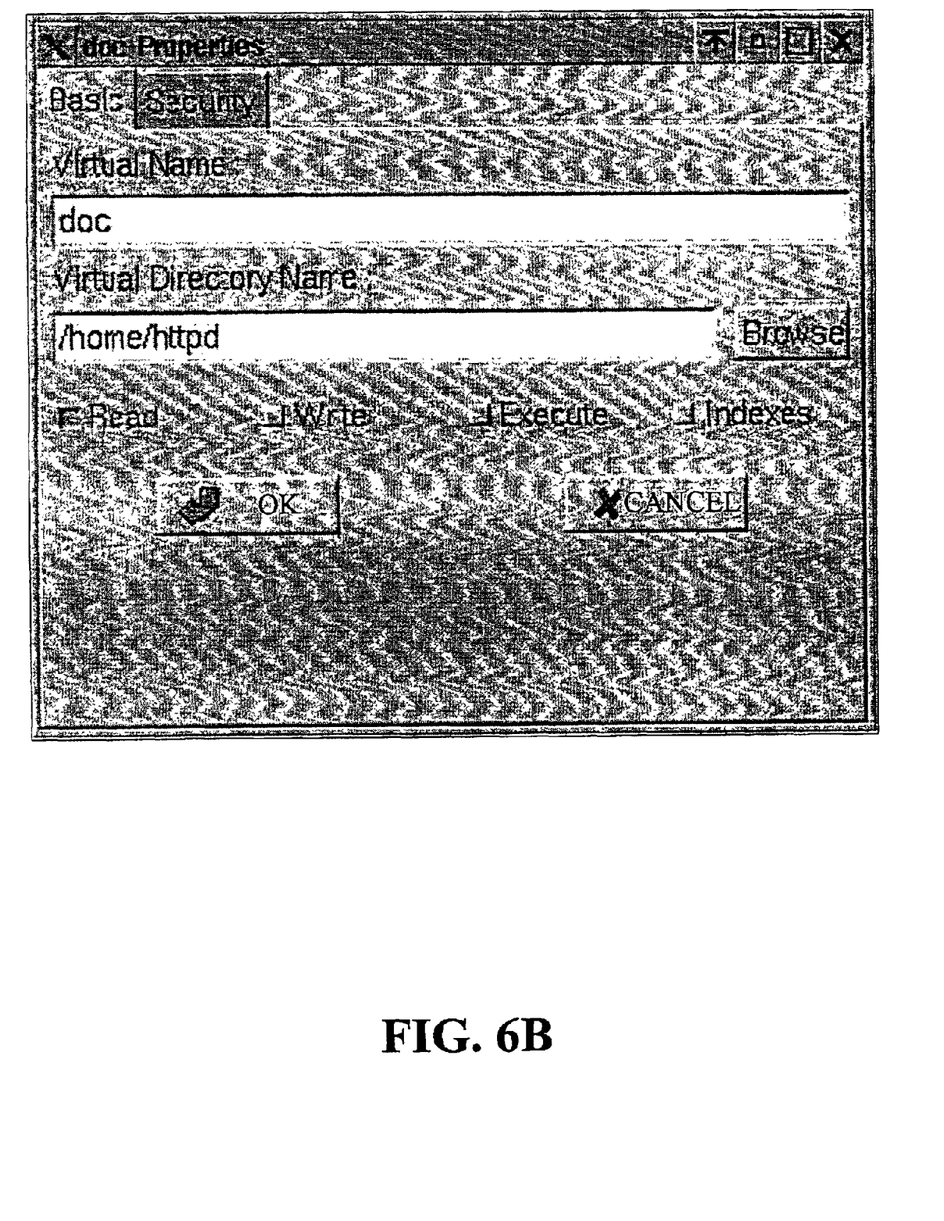
FIG. 6B is another screen snapshot showing that the second file server is executing the forth program.

Based on the method of this invention, the graphic interface control program in steps 101 has a fourth program. The forth program creates a screen with the same look as executing IIS (Internet Information Server) software in WINDOWS SERVER (including NT, 2000, XP, and all descended server OS) operating system. The second file server 20 can execute the fourth program and display the virtual directories and their corresponding actual directories in the second file server 20. FIG. 6A is a screen snapshot showing that the second file server 20 is executing the fourth program and displays the virtual directories needed in executing FTP server software (such as "wuftp", "proftp", or "vsftp" software) in the second file server 20. FIG. 6B is another screen snapshot showing that the second file server 20 is executing the fourth program. The screen shows setting status "read" to virtual directory "home/httpd".

Figure 7A:
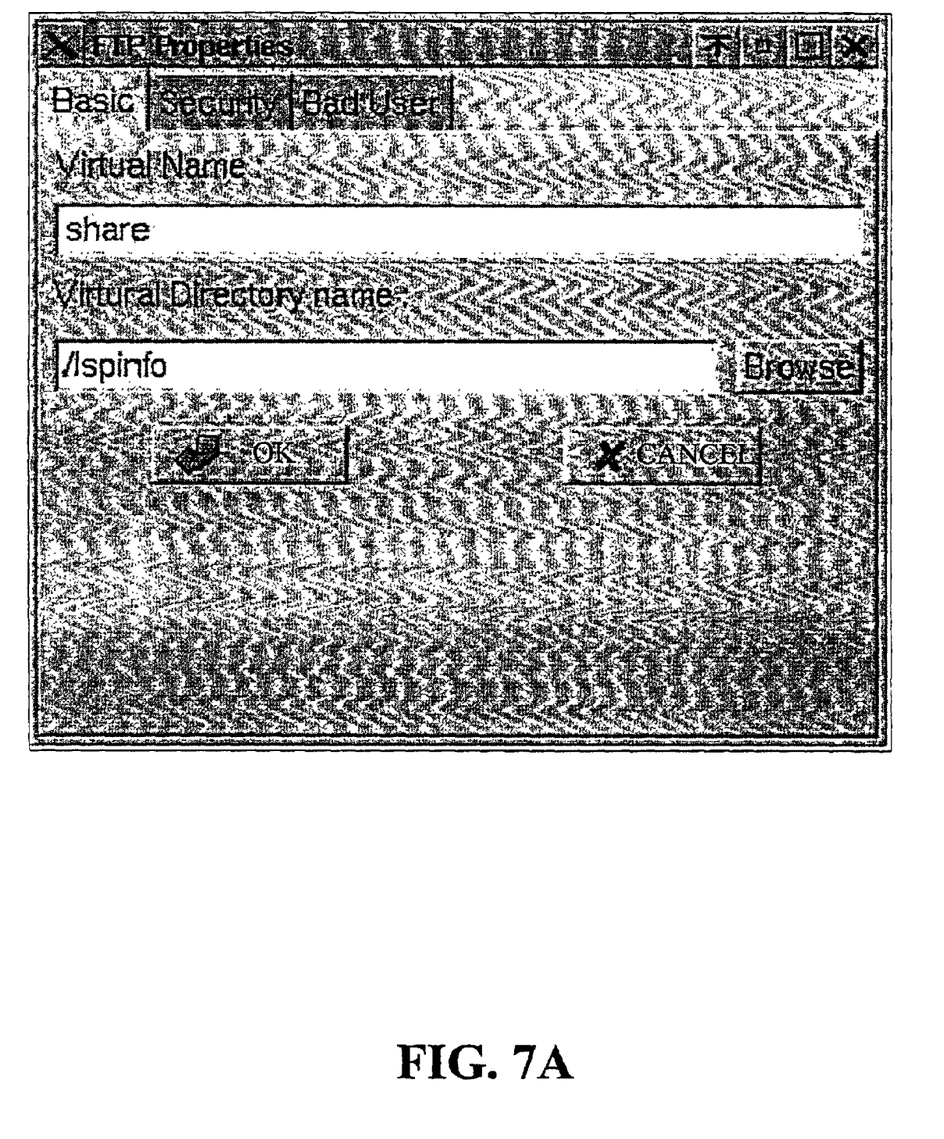
FIG. 7A is a screen snapshot showing that the second file server is executing the fifth program.
Figure 7B:
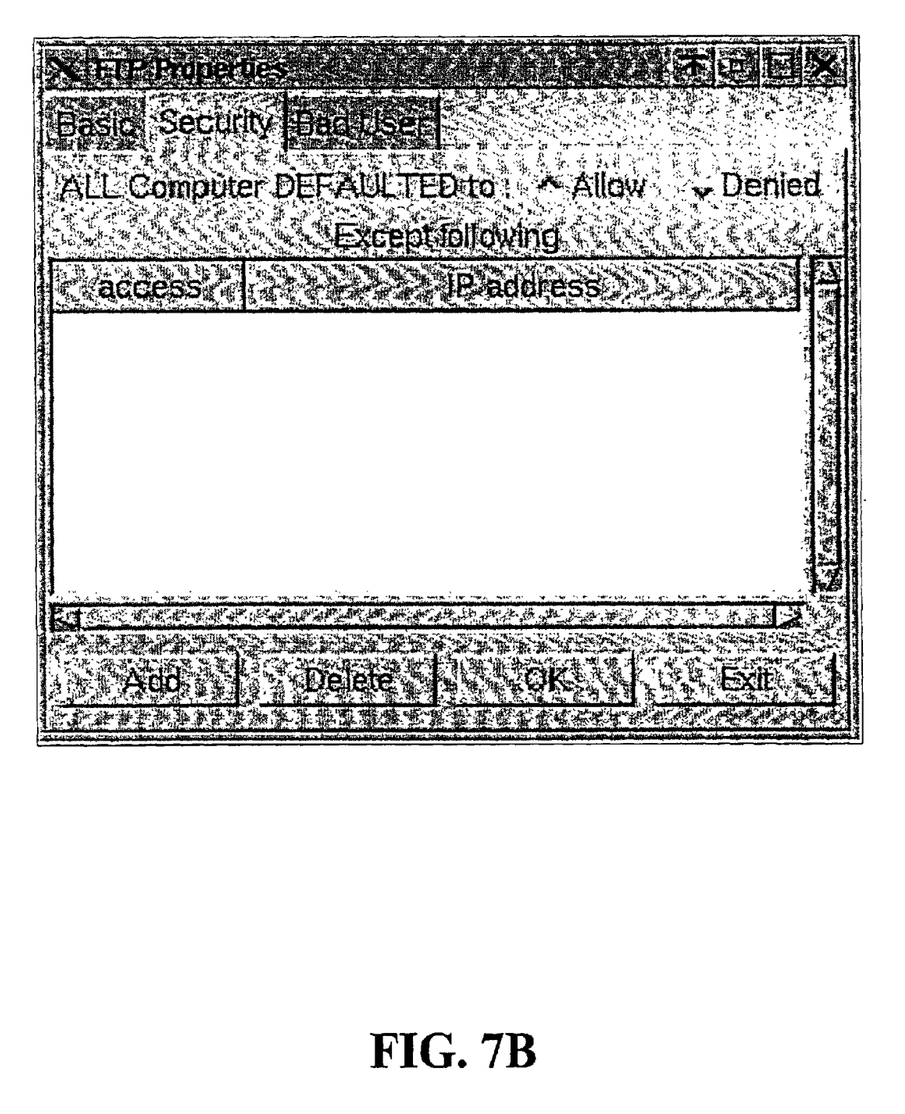
FIG. 7B is another screen snapshot showing that the second file server is executing the fifth program.

Based on the method of this invention, the graphic interface control program in steps 101 has a fifth program. The second file server 20 can execute the fifth program, give instructions to virtual directory configurations and actual directory configurations of a FTP software, such as "wuftp", "proftp", or "vsftp" software, and give instructions to revoke authority to users use the FTP (file transfer protocol) software. FIG. 7A is a screen snapshot showing that the second file server 20 is executing the fifth program. FIG. 7B is another screen snapshot showing that the second file server 20 is executing the fifth program.

Figure 8:
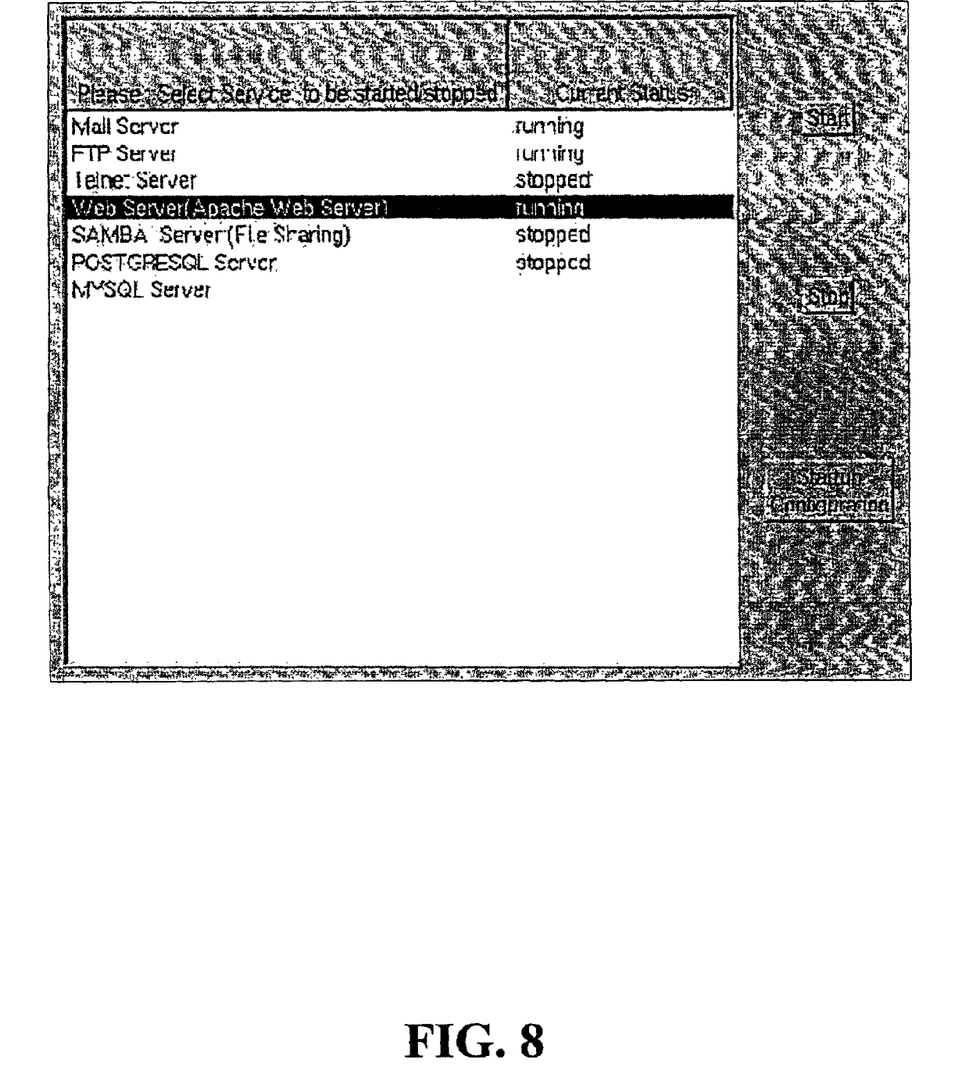
FIG. 8 is a screen snapshot showing that the second file server is executing the sixth program.

Further more, the method of this invention also provides a sixth program that gives run/stop instructions on multiple server software executed in the second file server. The second file server 20 can execute the sixth program, and give run/stop instructions on server software such as e-mail server software, FTP server software, Telnet server software, Web server software, SAMBA server software, POSTGRESQL server software, and MYSQL server software, etc. FIG. 8 is a screen snapshot showing that the second file server 20 is executing the sixth program.

Figure 9:
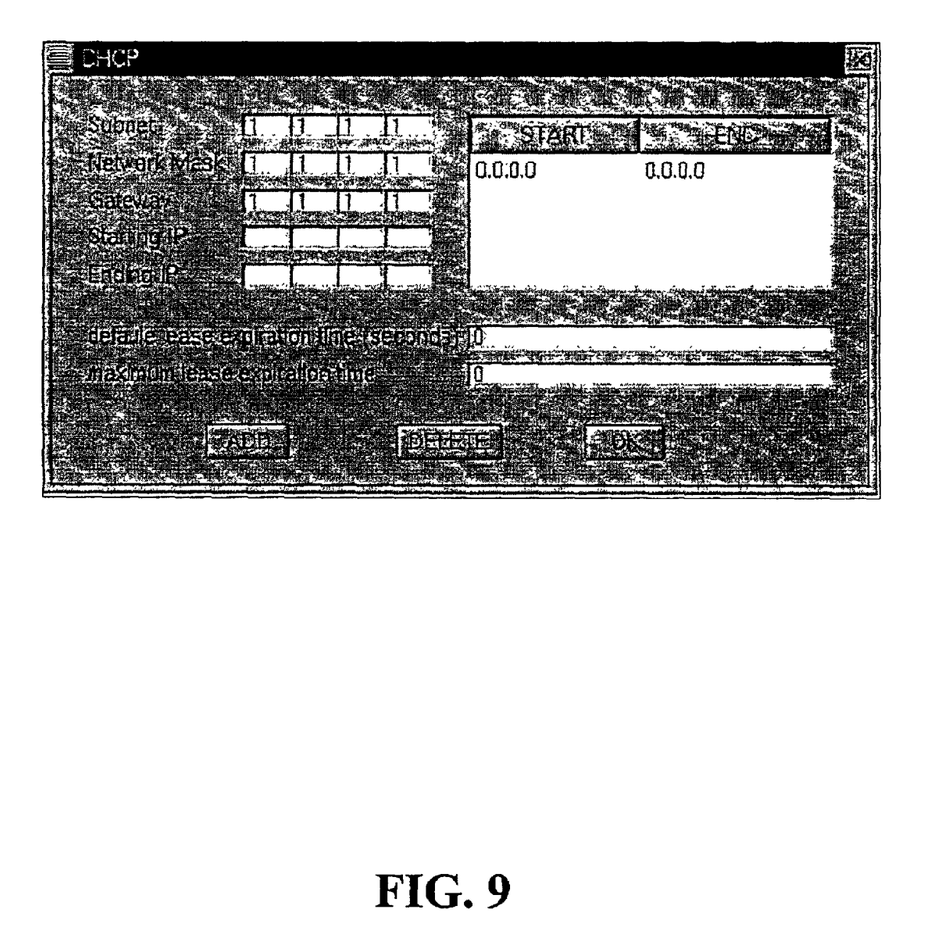
FIG. 9 is a screen snapshot showing that the second file server is executing the seventh program.

Further more, the method of this invention also includes a seventh program that sets multiple parameters of DHCP (Dynamic Host Configurations Protocol). The second file server 20 can execute the seventh program, write those preset multiple parameters into the associated configuration file "/etc/dhcpd.conf" of the LINUX operating system in the second file server 20, and execute DHCP software developed for LINUX operating system in the second file server 20. The parameters used to set DHCP are: one subnet parameter, one network mask parameter, one starting IP address parameter, one ending IP address parameter and one user name parameter. FIG. 9 is a screen snapshot showing that the second file server 20 is executing the seventh program.

After all, the preferred example shown above already demonstrates, but not limits the benefit of the invention. Any one who is familiar with this technique can change or modify the invention without leaving the spirit and scope of the invention. Thus, the protection scope of the invention should be based on the subject matter as defined in the appended claims.

What is claimed is:

1. A method of transferring resources between a first group of computers executing a first operating system and a second group of computers executing a second operating system, comprising the steps of:
   (a) transferring resources including multiple configurations, files and directories on a first file server of the first group to a second file server of the second group; and
   (b) executing a human-computer interface control program in the second operating system on the second file server for administrating the transferred resources, said interface control program having a same user interface as a user interface used in administrating resources on the first file server;
   wherein said step (a) further comprises the steps of:
   (a1) obtaining user configurations including password and group configurations of the first operating system in the first file server;
   (a2) executing a file sharing program in the second operating system on the second file server to add the user configurations obtained in said step (a1) into user configurations of the second file server; and
   (a3) executing the file sharing program in the second operating system on the second file server to write the group configurations obtained in said step (a1) into a group configuration file used in the second operating system of the second file server.

2. A method of transferring resources between a first group of computers executing a first operating system and a second group of computers executing a second operating system, comprising the steps of:
   (a) transferring resources including multiple configurations, files and directories on a first file server of the first group to a second file server of the second group; and
   (b) executing a human-computer interface control program in the second operating system on the second file server for administrating the transferred resources, said interface control program having a same user interface as a user interface used in administrating resources on the first file server;
   wherein said step (a) further comprises the steps of:
   (a1) obtaining virtual directory configurations and corresponding actual directory configurations of the first operating system in the first file server;
   (a2) executing a file sharing program and a hypertext transfer protocol server software in the second operating system on the second file server to write the virtual directory configurations and the corresponding actual directory configurations obtained in said step (a1) into a hypertext transfer protocol configuration file and an access configuration file of the hypertext transfer protocol server software respectively; and
   (a3) setting a default directory in the second file server and copying the virtual directory configurations and the corresponding actual directory configurations in the first file server to the default directory.

3. A method of transferring resources between a first group of computers executing a first operating system and a second group of computers executing a second operating system, comprising the steps of:
   (a) transferring resources including multiple configurations, files and directories on a first file server of the first group to a second file server of the second group; and
   (b) executing a human-computer interface control program in the second operating system on the second file server for administrating the transferred resources, said interface control program having a same user interface as a user interface used in administrating resources on the first file server;
   wherein said step (a) further comprises the steps of:
   (a1) obtaining virtual directory configurations and corresponding actual directory configurations of the first operating system in the first file server;

(a2) executing a file sharing program and a file transfer protocol server software in the second operating system on the second file server to write the virtual directory configurations and the corresponding actual directory configurations obtained in said step (a1) into a file transfer access directory and a file host directory of the second operating system respectively; and (a3) setting a default directory in the second file server and copying all actual directories in the actual directory configurations and files under all actual directories in the first file server to the default directory.

4. A method of transferring resources between a first group of computers executing a first operating system and a second group of computers executing a second operating system, comprising the steps of:

(a) transferring resources including multiple configurations, files and directories on a first file server of the first group to a second file server of the second group; and (b) executing a human-computer interface control program in the second operating system on the second file server for administrating the transferred resources, said interface control program having a same user interface as a user interface used in administrating resources on the first file server;

wherein the human-computer interface control program in said step (b) further comprises at least a program having a user interface identical to a user interface of an IIS (Internet Information Server) program in the first operating system for execution in the second file server to give instructions for displaying virtual directories and corresponding actual directories transferred to the second file server in said step (a).

5. A method of transferring resources between a first group of computers executing a first operating system and a second group of computers executing a second operating system, comprising the steps of:

(a) transferring resources including multiple configurations, files and directories on a first file server of the first group to a second file server of the second group; and (b) executing a human-computer interface control program in the second operating system on the second file server for administrating the transferred resources, said interface control program having a same user interface as a user interface used in administrating resources on the first file server;

wherein the human-computer interface control program in said step (b) further comprises at least a program for execution in the second file server to give instructions to virtual directory configurations and actual directory configurations of a file transfer protocol server software and revoke authority to users using the FTP (file transfer protocol) server software.

6. A method of transferring resources between a first group of computers executing a first operating system and a second group of computers executing a second operating system, comprising the steps of:

(a) transferring resources including multiple configurations, files and directories on a first file server of the first group to a second file server of the second group;

(b) executing a human-computer interface control program in the second operating system on the second file server for administrating the transferred resources, said interface control program having a same user interface as a user interface used in administrating resources on the first file server;

(c) executing a program on the second file server for setting multiple parameters of dynamic host configuration protocol;

(d) writing the multiple parameters into a dynamic host configuration protocol file of the second operating system in the second file server; and (e) executing a dynamic host configuration protocol software for the second operating system in the second file server.

\* \* \* \* \*